US012661211B1

(12) United States Patent　　(10) Patent No.: US 12,661,211 B1

Mertus　　(45) Date of Patent: Jun. 23, 2026

(54) COMBINED FLOSSER AND INTERPROXIMAL BRUSH DEVICE

(71) Applicant: Fabienne Mertus, Fort Lauderdale, FL (US)

(72) Inventor: Fabienne Mertus, Fort Lauderdale, FL (US)

(73) Assignee: JDP Dual Flosser LLC, Fort Lauderdale, FL (US)

( * ) Notice: Subject to any disclaimer, the term of this patent is extended or adjusted under 35 U.S.C. 154(b) by 442 days.

(21) Appl. No.: 18/110,222

(22) Filed: Feb. 15, 2023

Related U.S. Application Data

(60) Provisional application No. 63/346,136, filed on May 26, 2022.

(51) Int. Cl.
　　*A61C 15/02*　　(2006.01)
　　*A46B 15/00*　　(2006.01)
　　*A61C 15/04*　　(2006.01)
(52) U.S. Cl.
　　CPC ........ *A61C 15/045* (2013.01); *A46B 15/0071* (2013.01); *A61C 15/02* (2013.01); *A46B 2200/108* (2013.01)
(58) Field of Classification Search
　　CPC .............................. A61C 15/045; A61C 15/02
　　See application file for complete search history.

(56) References Cited

U.S. PATENT DOCUMENTS

| | | | | | |
|---|---|---|---|---|---|
| 542,782 | A | * | 7/1895 | Simons | A61C 15/046 |
| | | | | | 132/323 |
| 3,779,256 | A | * | 12/1973 | Maloney | A61C 15/02 |
| | | | | | 132/329 |
| 4,133,339 | A | * | 1/1979 | Naslund | A61C 15/045 |
| | | | | | 223/102 |
| 4,280,518 | A | * | 7/1981 | Gambaro | A46B 7/04 |
| | | | | | 132/329 |
| 5,560,377 | A | * | 10/1996 | Donovan | A61C 15/042 |
| | | | | | 132/321 |
| 5,775,346 | A | * | 7/1998 | Szyszkowski | A61C 15/00 |
| | | | | | 132/321 |
| 8,651,116 | B2 | * | 2/2014 | Slack | A61C 15/041 |
| | | | | | 132/200 |
| 11,358,312 | B2 | * | 6/2022 | Kikkawa | A46B 3/04 |
| 2005/0118553 | A1 | * | 6/2005 | Lagos Galvan | A61C 15/02 |
| | | | | | 433/141 |
| 2020/0268482 | A1 | * | 8/2020 | Herr | A61C 15/04 |

FOREIGN PATENT DOCUMENTS

| | | | | | |
|---|---|---|---|---|---|
| DE | 202012004030 U1 | * | 7/2012 | ........... | A61C 15/046 |
| KR | 20060017721 A | * | 2/2006 | ......... | A46B 15/0071 |
| WO | WO-2018055662 A1 | * | 3/2018 | ............. | A61C 15/02 |

* cited by examiner

*Primary Examiner* — Tatiana L Nobrega
(74) *Attorney, Agent, or Firm* — John Rizvi, P.A.—The Patent Professor®; John Rizvi

(57)　　　　　ABSTRACT

A combined flosser and interproximal brush device is provided as an elongate body. The interproximal brush and a floss threader are located on opposing ends of the elongate body, which elongate body is preferably flexible. The combined presence of the brush and flosser on one combined elongate body provides for easy accessibility and simultaneous use of the interproximal brush and floss threader to maintain oral hygiene.

13 Claims, 5 Drawing Sheets

COMBINED FLOSSER AND INTERPROXIMAL BRUSH DEVICE

CROSS-REFERENCE TO RELATED APPLICATIONS

This application claims the benefit of U.S. Provisional Patent Application Ser. No. 63/346,136, filed on May 26, 2022, which is incorporated by reference herein in its entirety.

FIELD OF THE INVENTION

The present invention relates generally to dental devices, and more particularly, to dental cleaning devices that can improve the regular practice of good dental habits and hygiene.

BACKGROUND OF THE INVENTION

The practice of good dental hygiene consists of brushing one's teeth multiple times each day and flossing at least once a day, if not more. These dental habits entail having ready access to at least a toothbrush, toothpaste, and dental floss at several points in the day.

However, since most people are engaged in employment and/or schooling, it becomes necessary to have duplicative sets of such dental hygiene components in various daily locations, which can be costly. These costs can be exacerbated for those who have multiple daily locations at which to be present for prolonged periods.

In addition, quite often even if such dental hygiene implements are able to be located at points of use, they are not necessarily readily available or accessible throughout the day. The nature of some types of employment may not provide for the brief work interruptions which would be necessary to engage in the noted various forms of dental hygiene.

Further, many people work long hours and in diverse locations, sometimes outdoors, which makes it difficult to store such dental care components in various places, or to carry such dental implements on one's person. Still yet, others find it difficult to find ready access to a restroom and the running water required to brush one's teeth. Therefore, such situations can result in people putting off engaging in the necessary dental care, and if such neglect is continued on a regular basis, to develop poor dental hygiene habits.

In addition to these challenges, certain people have more labored dental hygiene demands due to the presence of dental components such as orthodontics, dentures, lingual bars, and the like, which are either permanent, or difficult to remove and replace for purposes of dental hygiene. Such dental components make it difficult for a person to access the entirety of teeth surfaces and/or gaps which are located underneath such dental components due to the blocking presence of the aforementioned dental components.

Some means such as floss threaders have been developed to address the complexities of cleaning one's teeth while wearing braces or dentures. However, such floss threaders can be awkward in their use, often requiring the handling of small parts in order to access the dental floss. Furthermore, such floss threaders can be easily lost or misplaced. Still further, floss threaders cannot provide for a complete cleaning of one's teeth alone. Often, another dental implement in addition to a floss threader must be utilized to provide a complete cleaning, especially for those having the aforementioned dental components present. Thus, due to the complexity of having to utilize more than one dental tool, often enough such secondary tools are not unavailable, or go unused, and thus again, poor dental regimens tend to be developed, which lead to tooth decay.

Accordingly, there remains a need for a solution to at least one of the aforementioned problems. For instance, there is an established need for a dental device which is affordable, readily accessible, and which can be used by those having braces or dentures, and which facilitates and encourages the regular completion of thorough dental regimens.

SUMMARY OF THE INVENTION

The present invention is directed to a dental device which can promote the consecutive use of a floss threader and an interproximal brush, in either order. An interproximal brush is often, if not always, necessary to clean interproximal gaps in teeth that contain orthodontics or prosthodontics and any other dental components. The dental device described herein combines the use of an interproximal brush with a dental floss threader in one dental implement. This single dental implement, containing both dental tools, is easily accessible and can be easily carried on one's person. In addition, the presence of both tools in one dental implement assures that both the interproximal brush and the floss threader can be used in regular succession. The combined presence of both components strengthens the likelihood that both dental components will be used, and thus, a complete and more regular dental hygiene regimen will be established.

In a first implementation of the invention, a combined flosser and interproximal brush device comprising an elongate body having an interproximal brush at one end of the elongate body and a floss threader at an opposing end of the elongate body.

In a second aspect, the combined flosser and interproximal brush device can include an interproximal brush that is angled. The angling of the interproximal brush can provide for specific access to gaps that are not readily accessible by a straight interproximal brush.

In another aspect, the combined flosser and interproximal brush device may further contain a plastic handle. The plastic handle can be of the type used in a toothbrush which can be grasped by a human hand. The plastic handle can provide for better control and dexterity in using the interproximal brush as well as the floss threader.

In yet another aspect, the combined flosser and interproximal brush device may contain a thumb-sized plastic handle. The thumb-sized plastic handle can have two interconnecting parts which facilitate the removal and replacement of the interproximal brush or the interchange of different sized interproximal brushes. The thumb-sized plastic handle can also provide for better control and dexterity when the floss threader is used.

In yet an even another aspect, the combined flosser and interproximal brush device may contain a flexible tubular handle. The flexible tubular handle can provide for better control and dexterity for both the interproximal brush and floss threader due its bendable nature and narrow circumference.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a convenient and readily available combined flosser and interproximal brush device that is capable of cleaning the teeth of a person, more specifically a person having orthodontics and prosthodontics, and which combined presence of both the flosser and interproximal brush sets up a tool which can facilitate and provide for regular and through cleaning of such teeth, and thus, the establishment of a regular dental regimen which provides for improved and sustainable dental health.

Figure 1:
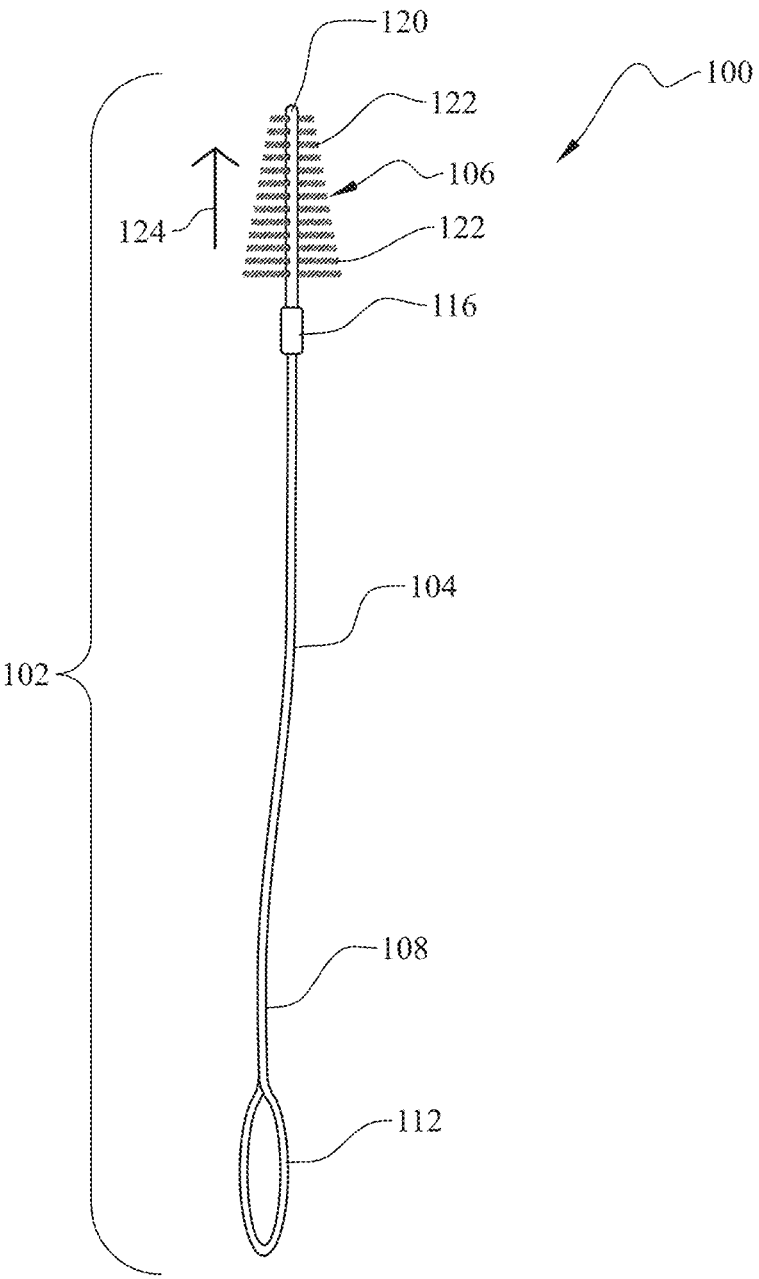
FIG. 1 presents a perspective view of a combined flosser and interproximal brush device in accordance with a first embodiment of the present invention.

Referring initially to FIG. 1, the combined flosser and interproximal brush device 100 has the interproximal brush 106 at one end of an elongate body 102 and the floss threader 108 at the opposing end of the elongate body 102.

The elongate body 102 comprises the interproximal brush 106 and the floss threader 108 directly connected to each other, and thus, the expression "elongate body 102" is used interchangeably herein with the expression "combined flosser and interproximal brush device 100".

The elongate body 102 can be preferably flexible up to 180 degrees, although other lesser degrees of flexibility are envisioned as well, such as, from 10 degrees to 150 degrees, from 10 degrees to 120 degrees, from 10 degrees to 90 degrees, from 10 degrees up to 75 degrees, from 10 degrees up to 60 degrees, from 10 degrees up to 45 degrees and from 10 degrees up to 30 degrees.

The elongate body 102 can be flexible by being bent at any point there along. For example, the elongate body 102 can be bent at a midpoint 104. Alternatively, the elongate body 102 can be bent immediately below a connection point connector 116, which connection point connector 116, serves to connect the floss threader 108 and the interproximal brush 106. The connection point connector can be made of a biodegradable and/or recyclable material, such as polypropylene or bamboo.

Still further, the interproximal brush 106 itself can be such that it can be bendable along its length in any of the aforementioned degrees of flexibility.

The entire elongate body 102 can preferably be made of the same or different materials.

In one embodiment, the interproximal brush 106 and the floss threader 108 are made of the same general materials. For example, the interproximal brush 106 can be made of a wire central component 120 with plastic bristles 122, preferably polypropylene or nylon bristles 122, attached to the wire central component 120 and emanating therefrom.

The bristles 122 of the interproximal brush 106 can be tapered, for example, in a triangle type shape, with the point of the triangle being in a direction 124 away from the connector 116, although other tapering shapes such as conical, tubular, round and the like are also contemplated.

Different length and size interproximal brushes 106 are contemplated. Generally, the interproximal brush can be from about 1 to about 3 inches in length, preferably from about 1.5 to about 2 inches in length. The taper of the interproximal brush 106 can also be of any suitable and varying set of sizes. The interproximal brush 106 can be replaceable with another new interproximal brush 106 when the previous interproximal brush 106 is expended, or the interproximal brush 106 can be replaced with a different sized interproximal brush 106 which is desired for a different gap in the teeth.

In general, the floss threader 108 can be a length of plastic material in any suitable shape, tubular, conical, triangular and combination thereof. In one embodiment, the floss threader 108 can be a central metal wire length surrounded by a corresponding coating of plastic. In addition, the floss threader 108, with or without the central metal wire, can also be made of, or surrounded by (in the case of a central metal wire), any plastic material, such as any one or more of polypropylene, polyurethane, polyisoprene, silicone, polyethylene, such as low-density polyethylene or high-density polyethylene. In one embodiment, the floss threader 108 can be polypropylene.

The interproximal brush 106 and the floss threader 108 can preferably be made of an antibacterial material or can be coated with an antibacterial coating.

The floss threader 108 can be used with any type of floss. Preferably the floss can be made of nylon, preferably waxed nylon. Alternatively, the floss can be made of polytetrafluoroethylene (PTFE) material or can be nylon coated with PTFE. In addition, the floss can be a super floss type dental floss made of a yarn-like material that has harder sections at each end that can be used to clean around orthodontics as is understood by those skilled in the art. Still further, the floss can comprise dental tape which can be thicker and taller than conventional dental floss. Still yet further the floss can be flavored to a desirable fruit flavor.

The floss threader 108 can have any suitable thickness, and can be from about 0.1 mm to about 25 mm, preferably from about 1 mm to about 20 mm, and most preferably from about 5 mm to about 15 mm.

The length of the floss threader 108 can be of any suitable size desired to enable one to handle in order to draw dental floss into one's desired portion of teeth. For example, the length of the floss threader 108 can be from 3 to about 6 inches, preferably from about 3 to about 5 inches and most preferably from about 3.5 to about 4 inches.

The floss threader 108 can terminate in a loop 112. The loop 112 can be of any suitable size. The loop 112 can have a circumference of from about 1 inch to about 4 inches, preferably from about 1.5 inches to about 3 inches. In another perspective, the loop 112 can have a diameter of from 0.25 cm to about 1 cm, preferably from about 0.25 cm to about 0.75 cm, most preferably, about 0.5 cm. The loop 112 can have an unstretched length along the elongate body 102 of from about 1.5 to about 3 cm, preferably about 2 cm. The loop 112 can also be adjustable in size to accommodate different size teeth and the limited dexterity of some people to use the same.

Figure 2:
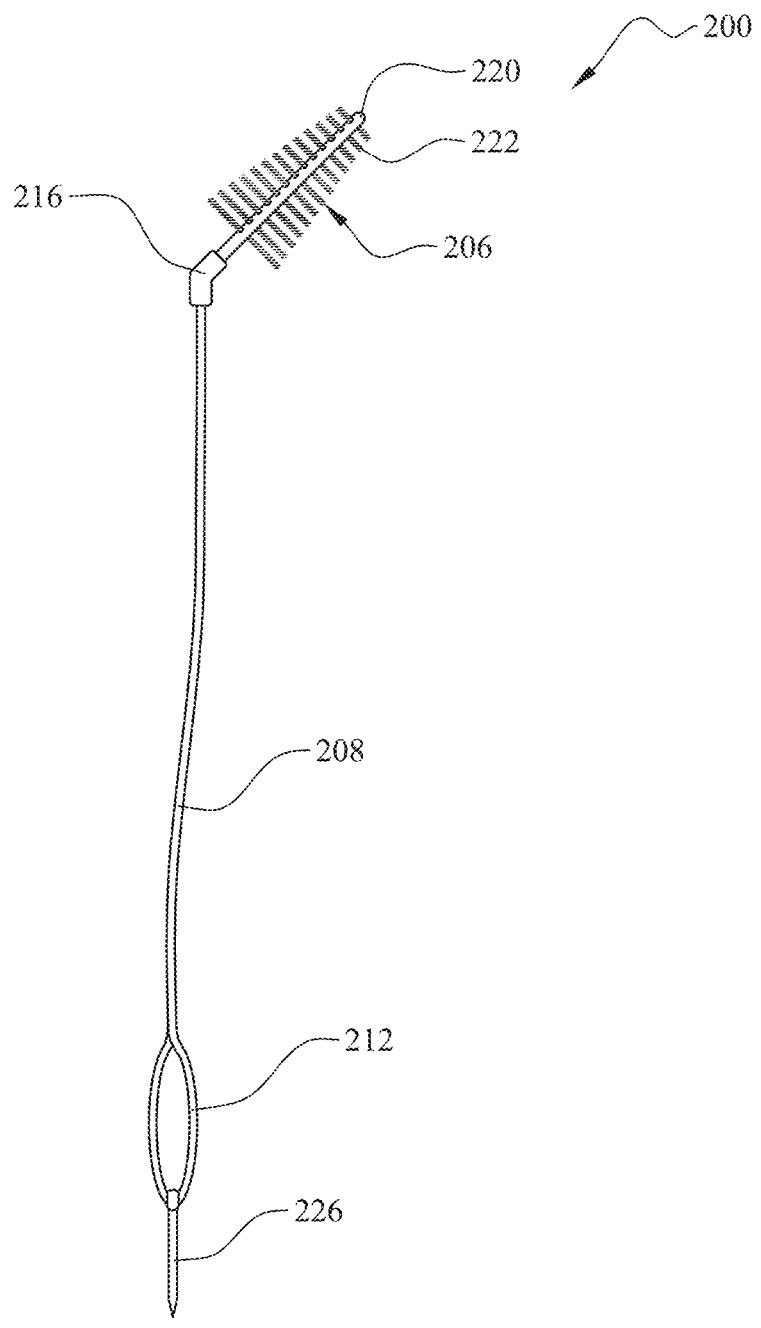
FIG. 2 presents a perspective view of the combined flosser and angled interproximal brush device in accordance with a second embodiment of the present invention.

Referring next to FIG. 2 a combined flosser and interproximal brush device 200 is shown in accordance with a second illustrative embodiment of the invention. Reference numerals which correspond to like elements of the combined flosser and interproximal brush device 100 heretofore described with respect to FIG. 2 are designated by the same reference numerals in the 200-224 series in FIG. 2.

Specifically, in the combined flosser and interproximal brush device 200, there can be a bend in the connection point connector 216 which is shown at an angle of 45 degrees, although alternate angles are envisioned. For example, the connection point connector can be bent at an angle of from 10 degrees to 90 degrees, preferably 15 to 75 degrees, more preferably from 20 degrees to 60 degrees, and most preferably, as noted above, at about 45 degrees.

In addition, the loop 212 can have a pointed extension 226 affixed to an end of the loop 212. The pointed extension 226 can preferably be made up of a malleable material which facilitates the insertion of the floss threader 208 initiating with the loop 212 into a gap in-between the desired teeth.

The pointed extension 226 can preferably be a plastic material that is biodegradable and/or recyclable such as polypropylene. The pointed extension 226 can vary in size depending on the depth of the gaps in teeth which must be entered. For example, the pointed extension 226 can be from about 0.25 cm to about 3 cm, preferably from about 0.5 cm to about 2 cm, and most preferably from about 0.5 cm to about 1 cm in length. The pointed extension can have a thickness of from about 0.25 mm to about 50 mm, and preferably, from about 1 mm to about 25 mm.

Figure 3:
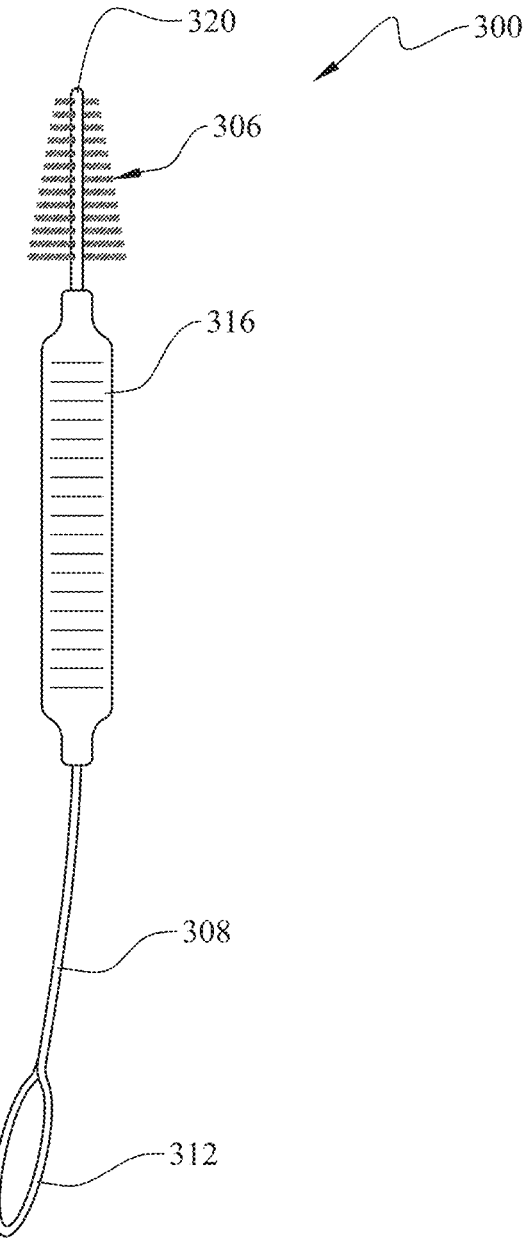
FIG. 3 presents a perspective view of the combined flosser and interproximal brush device having a plastic handle in accordance with a third illustrative embodiment of the present invention.

Referring next to FIG. 3 a combined flosser and interproximal brush device 300 is shown in accordance with a third illustrative embodiment of the invention. Reference numerals which correspond to like elements of the combined flosser and interproximal brush device 100 and 200 heretofore described with respect to FIGS. 1-2 are designated by the same reference numerals in the 300-326 series in FIG. 3.

Specifically, in the combined flosser and interproximal brush device 300, the connection point connector 316 can be a plastic handle interposed between the interproximal brush 306 and the floss threader 308. The plastic handle 316 can be of a size sufficient to accommodate the grasp of a human hand, and thus, due to the differences in human hand sizes, the plastic handle 316 can be of different thickness and lengths.

Generally, the plastic handle 316 can be of a shape and size that can be commensurate with a conventional tooth-brush handle. For example, the plastic handle 316 can be of from about 3 to about 6 inches, preferably from about 3 to 4 inches in length, and from about 0.5 cm to about 2.5 cm, preferably from about 1 cm to about 2 cm in width. The plastic handle can preferably be a plastic material that is biodegradable and/or recyclable such as polypropylene.

The plastic handle 316 can provide a user with the dexterity and grip necessary to use the interproximal brush 306 and the floss threader 308.

Figure 4:
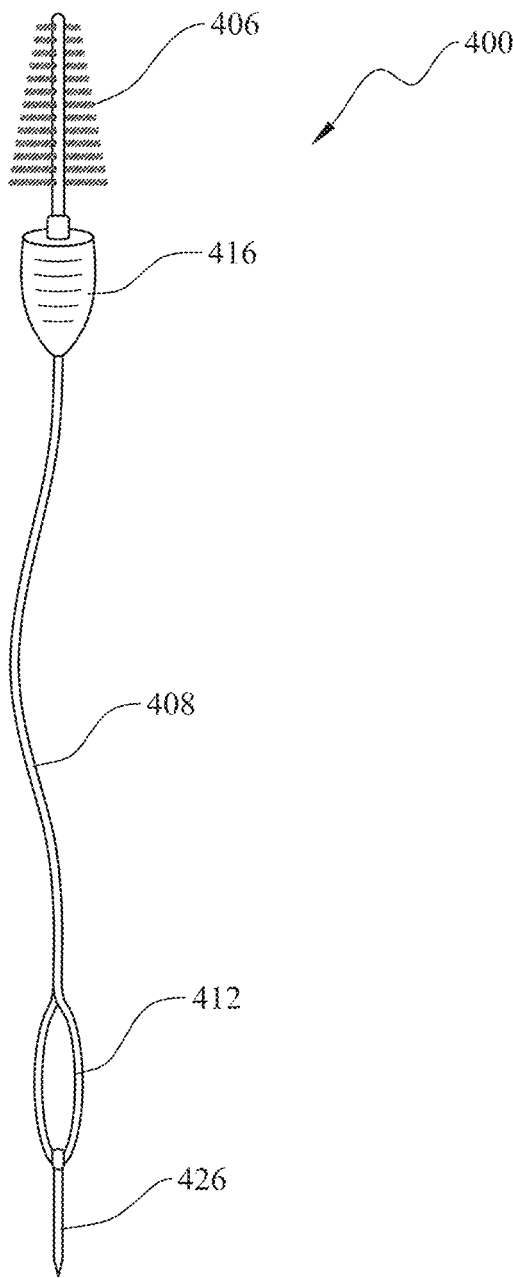
FIG. 4 presents a perspective view of the combined flosser and interproximal brush device having a thumb-sized plastic handle in accordance with a fourth illustrative embodiment of the present invention.

Referring next to FIG. 4 a combined flosser and interproximal brush device 400 is shown in accordance with a fourth illustrative embodiment of the invention. Reference numerals which correspond to like elements of the combined flosser and interproximal brush device 100, 200 and 300 heretofore described with respect to FIGS. 1-3 are designated by the same reference numerals in the 400-426 series in FIG. 4.

Specifically, in the combined flosser and interproximal brush device 400, the connection point connector 416 can be a thumb-sized plastic handle 416 interposed between the interproximal brush 406 and the floss threader 408. The thumb-sized plastic handle 416 can be of a size sufficient to accommodate the thumb of a human hand, and thus, due to the differences in human finger sizes, the thumb-sized plastic handle 416 can be of different thickness and lengths.

Generally, the thumb-sized plastic handle 416 can be of from about ½ inch to about 2 inches in length, preferably from about ¾ of an inch to 1 inch in length, and from about 0.5 cm to about 1.5 cm, preferably from about 1 cm to about 2 cm in width. The plastic handle can preferably be a plastic material that is biodegradable and/or recyclable such as polypropylene.

The thumb-sized plastic handle 416 can function to provide for removal and replacement of the interproximal brush 406 from the combined flosser and interproximal brush device 400. Such can be accomplished through the use of an interlocking socket and post system as is known to those skilled in the art.

The thumb-sized plastic handle 416 can provide a user with the dexterity and grip necessary to use the interproximal brush 406.

Figure 5:
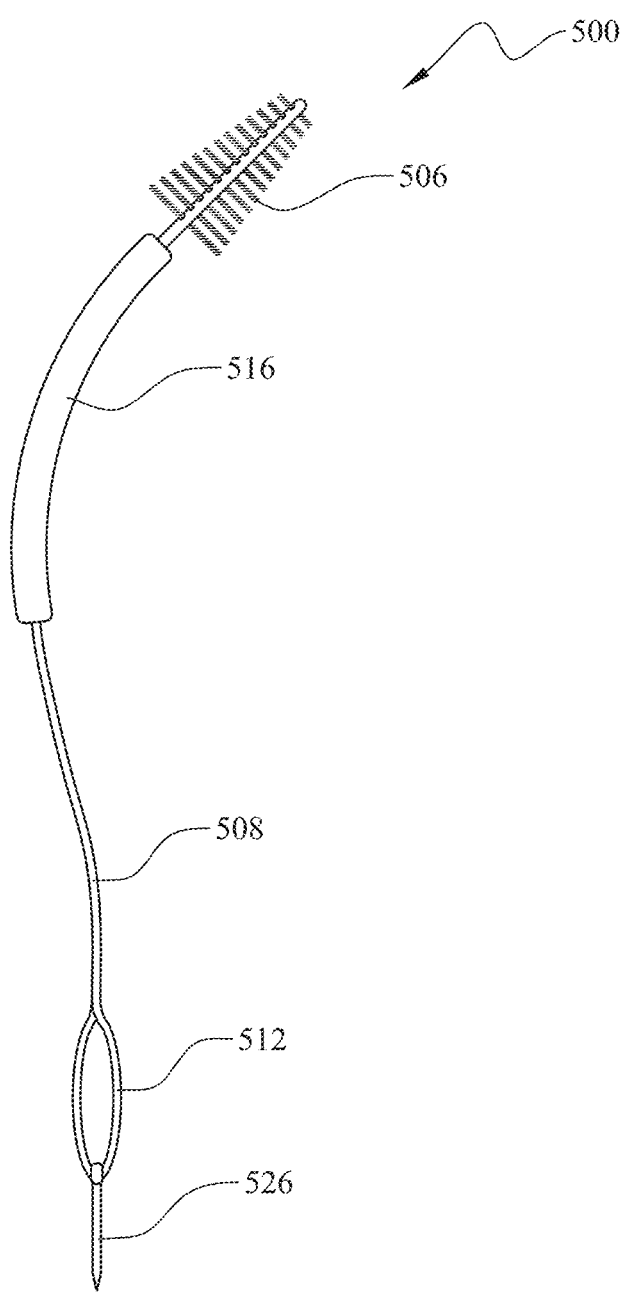
FIG. 5 presents a perspective view of the combined flosser and interproximal brush device having a flexible tubular handle in accordance with a fourth illustrative embodiment of the present invention.

Referring next to FIG. 5 a combined flosser and interproximal brush device 500 is shown in accordance with a fifth illustrative embodiment of the invention. Reference numerals which correspond to like elements of the combined flosser and interproximal brush device 100, 200, 300 and 400 heretofore described with respect to FIGS. 1-4 are designated by the same reference numerals in the 500-526 series in FIG. 5.

Specifically, in the combined flosser and interproximal brush device 500, the connection point connector 516 can be a tubular plastic handle 516 interposed between the interproximal brush 506 and the floss threader 508. More specifically, the tubular plastic handle 516 can be arced. The degree of arc can be of any suitable are that would be suitable to employ the interproximal brush 506. For example, the arc can be from about 10 degrees to about 180 degrees, more preferably from about 20 degrees to about 120 degrees, even more preferably from about 30 degrees to about 90 degrees, and most preferably from about 40 to about 60 degrees, with about 45 degrees being one suitable arc.

The tubular plastic handle 516 can be of a material that is bendable and malleable to achieve different degrees of arc, e.g., a malleable thermoplastic material, or a malleable plastic material containing an internally threaded bendable metal material, such as any of the plastic materials described herein, with polypropylene being one example thereof.

Alternative embodiments are contemplated in addition to the embodiments(s) shown and/or described herein. In an alternative embodiment, there is provided a method of employing the combined flosser and interproximal brush. The loop of the floss threader can be inter-looped with a length of dental floss or dental tape. Then the loop of the floss threader, optionally with the pointed extension, can be inserted into a gap between teeth and below an orthodontic or prosthodontic component. The material of the floss threader being of sufficient rigidity to enable the quick and easy insertion of the floss threader in-between the teeth. After insertion of floss via the threader, the floss threader can be removed and the gap in the teeth can be flossed. Thereafter the floss can be removed. After removal of the floss, the readily available interproximal brush end of the floss threader can be used to clean the same gap and reach points not accessible or plaque not easily removable by the floss alone. Such a method provides for quick access to both the floss threader and the interproximal brush. The quick and easy joint location of the floss threader and the interproximal brush tends to encourage both implements to be used, and thus, a more through dental regimen tends to be developed.

In an alternate embodiment, the combined flosser and interproximal brush device does not contain a handle or connection point connector, and thus, in use, the floss threader, without floss, can be first passed through a suitable gap in one's teeth, and then the device can be pulled through the gap to utilize the interproximal brush without having to remove the device from the person's mouth and without having to employ any dental floss.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A combined floss threader and interproximal brush device comprising:

an interproximal brush having a core and a plurality of bristles extending from the core, where the interproximal brush has a proximal end and a distal end, the distal end of the interproximal brush defines a terminal distal end of the device;

a connector having one end thereof coupled to the proximal end of the interproximal brush; and a floss threader having a linear portion and a loop, where a distal end of the linear portion is connected to an opposing end of the connector, and the loop defines the proximal end of the floss threader;

wherein the interproximal brush is angled with respect to an axis extending through the floss threader;

wherein the linear portion and the loop are constructed from a central metal wire surrounded by a coating of plastic; and wherein the loop, linear portion, connector and interproximal brush are configured to be inserted in a gap between adjacent teeth.

2. The combined floss threader and interproximal brush device of claim 1 wherein the loop has a pointed extension affixed to an end of the loop.

3. A combined floss threader and interproximal brush device comprising:

an interproximal brush having a core and a plurality of bristles extending from the core, where the interproximal brush has a proximal end and a distal end, the distal end of the interproximal brush defines a terminal distal end of the device;

a handle having a first end coupled to the proximal end of the interproximal brush;

a floss threader having a linear portion and a loop, where a distal end of the linear portion is-connected to an opposing second end of the handle, and the loop defines the proximal end of the floss threader; and a pointed extension affixed to and extending proximally from the loop, wherein the pointed extension and loop are configured to be inserted in a gap between adjacent teeth;

wherein the linear portion and the loop are constructed from a central metal wire surrounded by a coating of plastic.

4. The combined floss threader and interproximal device of claim 3, wherein the handle is a plastic handle.

5. The combined floss threader and interproximal brush device of claim 4, wherein the handle is plastic and is from 3 inches to 6 inches in length and from 0.5 cm to 2.5 cm in width.

6. The combined floss threader and interproximal brush device of claim 4, wherein the handle has a cylindrical distal portion and a conical proximal portion and is from about ½ inch to about 2 inches in length and from about 0.5 cm to about 1.5 cm in width.

7. The combined floss threader and interproximal brush device of claim 4, wherein the handle is detachably connected to the interproximal brush.

8. The combined floss threader and interproximal brush device of claim 4, wherein the handle is flexible and tubular.

9. The combined floss threader and interproximal brush device of claim 8, wherein the handle is flexible up to 180 degrees.

10. The combined floss threader and interproximal brush device of claim 8, wherein the handle is arced.

11. The combined floss threader and interproximal brush device of claim 10 wherein the degree of arc is from about 10 degrees to about 180 degrees.

12. A method of flossing a gap between teeth, comprising:

providing a combined floss threader and interproximal brush device, wherein the combined floss threader and interproximal brush device comprises: an interproximal brush having a core and a plurality of bristles extending from the core, where the interproximal brush has a proximal end and a distal end, the distal end of the interproximal brush defines a terminal distal end of the device; a handle having a first end coupled to the proximal end of the interproximal brush; a floss threader having a linear portion and a loop, where a distal end of the linear portion is-connected to an opposing second end of the handle, and the loop defines the proximal end of the floss threader; and a pointed extension affixed to and extending proximally from the loop;

wherein the interproximal brush is angled with respect to an axis extending through the floss threader and wherein the linear portion and the loop—are constructed from a central metal wire-surrounded by a coating of plastic;

looping a length of dental floss or dental tape through the loop of the floss threader;

inserting the pointed extension and loop of the floss threader into a gap between teeth and below an orthodontic or prosthodontic component;

flossing the gap with the length of dental floss or dental tape;

removing the floss threader; and cleaning the gap in the teeth with the interproximal brush.

13. A method of cleaning a gap between teeth, comprising:

providing a combined floss threader and interproximal brush device, wherein the combined floss threader and interproximal brush device comprises: an interproximal brush having a core and a plurality of bristles extending from the core, where the interproximal brush has a proximal end and a distal end, the distal end of the interproximal brush defines a terminal distal end of the device; a connector having one end thereof coupled to the proximal end of the interproximal brush; and a floss threader having a linear portion and a loop, where a distal end of the linear portion is connected to an opposing end of the connector, and the loop defines the proximal end of the floss threader wherein the interproximal brush is angled with respect to an axis extending through the floss threader and wherein the linear portion and the loop are constructed from a central metal wire surrounded by a coating of plastic passing the floss threader, without floss, through a gap between teeth, and pulling the device through the gap such that the interproximal brush passes through the gap.

\* \* \* \* \*